US011173877B2

(12) United States Patent
Michel et al.

(10) Patent No.: US 11,173,877 B2
(45) Date of Patent: Nov. 16, 2021

(54) AUTOMATIC ACCESS AND STARTING SYSTEM FOR MOTOR VEHICLE AND METHOD FOR MANAGING ACCESS TO A VEHICLE

(71) Applicant: PSA AUTOMOBILES SA, Poissy (FR)

(72) Inventors: Stephane Michel, Foussemagne (FR); Sebastien Sauvageot, Montbeliard (FR); Nicolas Leroy, Belfort (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/267,960

(22) PCT Filed: Jul. 15, 2019

(86) PCT No.: PCT/FR2019/051764
§ 371 (c)(1),
(2) Date: Feb. 11, 2021

(87) PCT Pub. No.: WO2020/053491
PCT Pub. Date: Mar. 19, 2020

(65) Prior Publication Data
US 2021/0245709 A1   Aug. 12, 2021

(30) Foreign Application Priority Data

Sep. 10, 2018   (FR) ........................... 1858085

(51) Int. Cl.
*B60R 25/24*   (2013.01)
*B60R 25/01*   (2013.01)
*G07C 9/00*   (2020.01)

(52) U.S. Cl.
CPC ............ *B60R 25/245* (2013.01); *B60R 25/01* (2013.01); *G07C 9/00309* (2013.01);
(Continued)

(58) Field of Classification Search
None
See application file for complete search history.

(56) References Cited

U.S. PATENT DOCUMENTS 7,053,771 B2 *   5/2006   Hussmann .............. H04L 63/18
340/539.11
8,427,276 B2 *   4/2013   McBride ............... B60R 25/245
340/5.64
(Continued)

FOREIGN PATENT DOCUMENTS

EP    2631880 A2    8/2013
WO    2010057902 A1    5/2010

OTHER PUBLICATIONS

International Search Report for PCT/FR2019/051764 dated Nov. 6, 2019.
Written Opinion for PCT/FR2019/051764 dated Nov. 6, 2019.

*Primary Examiner* — Carlos Garcia
(74) *Attorney, Agent, or Firm* — Sandberg Phoenix & von Gontard, P.C.

(57) ABSTRACT

The invention concerns an automatic access and starting system for a motor vehicle, comprising an on-board access management system and at least one identifier (3) such as an electronic key, the access management system being configured to detect and authenticate the identifier (3) when it is close to the vehicle (1), the identifier (3) being configured to emit an authentication signal in response to an interrogation signal emitted by the management and access system, the identifier (3) comprising a memory for storing an instruction relative to a command issued by the carrier of the identifier (3) if this command is issued during the phase of detection and authentication by the on-board system, the instruction being stored temporarily in order for the identifier to be able to emit a signal related to the command when the detection and authentication phase is complete.

10 Claims, 1 Drawing Sheet

(52) U.S. Cl.
CPC ............. *G07C 2009/00357* (2013.01); *G07C 2009/00539* (2013.01); *G07C 2009/00547* (2013.01); *G07C 2209/64* (2013.01)

(56) References Cited

U.S. PATENT DOCUMENTS

| | | | |
|---|---|---|---|
| 9,894,613 B2 * | 2/2018 | Scheim | .............. G07C 9/00309 |
| 10,081,334 B1 * | 9/2018 | Chen | .................. G06Q 30/0645 |
| 2014/0320260 A1 | 10/2014 | Van Wiemeersch et al. | |
| 2014/0379208 A1 * | 12/2014 | McQuade | .......... G06Q 10/0832 |
| | | | 701/33.2 |
| 2015/0235494 A1 | 8/2015 | Creguer et al. | |
| 2017/0298659 A1 * | 10/2017 | Watanabe | ............... E05B 77/48 |
| 2017/0342750 A1 * | 11/2017 | Hiramine | .............. B60R 25/245 |
| 2019/0236960 A1 * | 8/2019 | Sakurada | ............... G08G 1/207 |

\* cited by examiner

AUTOMATIC ACCESS AND STARTING SYSTEM FOR MOTOR VEHICLE AND METHOD FOR MANAGING ACCESS TO A VEHICLE

CROSS-REFERENCE TO RELATED APPLICATIONS

This application is the US National Stage under 35 USC § 371 of International Application No. PCT/FR2019/051764, filed 15 Jul. 2019 which claims priority to French Application No. 1858085 filed 10 Sep. 2018, both of which are incorporated herein by reference.

BACKGROUND

The invention relates to the field of managing access to a motor vehicle. More specifically, the invention relates to an automatic access and starting system for a motor vehicle as well as a method for managing access to a motor vehicle.

Motor vehicles are known which comprise an access and starting system without manual intervention, commonly called "hands-free access and starting." Such a system makes it possible to unlock the doors and/or other anti-theft security devices of the motor vehicle, without manual intervention by the user. For this purpose, the user is provided with an identifier, such as a key or an electronic card, commonly called "hands-free identifier," which allows a control unit for unlocking the motor vehicle to recognize the authorized user, when this user is near a door of the motor vehicle and, generally, when the user actuates the opening handle or more generally any device for controlling the exterior opening of the door.

The identifier can, for example, be an electronic card or a transmitter supplying an identification code that must be recognized by the unlocking control unit of the motor vehicle to allow the unlocking maneuver.

Generally, the automatic access and starting system comprises means for detecting the hands-free identifier within a zone inside the passenger compartment of the motor vehicle and in several zones located at least partially outside the motor vehicle, for example in the vicinity of the vehicle doors and in the vicinity of the rear part of the vehicle. Thus, the automatic access and starting system is able to recognize an identifier when its carrier approaches and unlocks the vehicle.

Functions other than unlocking can also be implemented, such as starting the vehicle or adjusting customized settings (height and position of the driver's seat, etc.), or even turning on the headlights and one or more lights forming a so-called "courtesy light."

To best implement these functionalities, it is necessary for the vehicle to be able to detect an identifier (and therefore its carrier) when it enters at least one (virtually) delimited zone around the vehicle. To allow the implementation of advanced functionalities, it is advantageous for several zones to be delimited around the vehicle, these zones being more or less restricted and each including the vehicle.

The detection of a hands-free identifier is based on an information exchange protocol between the vehicle and the identifier, making it possible to confirm that the latter is an authorized identifier. Thus, the automatic access and start-up system emits an interrogation signal at regular intervals, pending a response from an identifier (a process generally known as "polling"). When an identifier captures the interrogation signal emitted by a vehicle, it emits a response to this signal which initially allows the vehicle to locate the identifier. Complementary exchanges then take place between the vehicle and the identifier in order to achieve strong authentication and to authorize, or not authorize, access to the vehicle.

These data exchanges between the vehicle and the identifier have the drawback of preventing the receipt and, thus, execution of a command issued by the carrier of the identifier, via the command button(s) present on the identifier. Now, the repetitions of the interrogation signal can be emitted very close together, two emissions for example being able to be separated by an interval of only 300 milliseconds. In this context, the probability that a command performed by the carrier of an identifier takes place during a communication between the vehicle and the identifier is very high. However, no automatic access and start-up system is currently known which can simultaneously manage a communication for the purposes of authenticating an identifier and the processing of a command carried out by the carrier of this identifier.

SUMMARY

The object of the present invention is to address the drawbacks of the prior art, and more particularly those described above, by proposing a hands-free access and start-up system which allows strong authentication of a hands-free identifier while managing the commands issued by the carrier of this identifier during the data exchange phases necessary for authentication.

To this end, an automatic access and starting system for a motor vehicle is disclosed which comprises an on-board access management system and at least one identifier such as an electronic key, the access management system being configured to detect and authenticate the identifier when it is in proximity to the vehicle. The identifier is configured to emit an authentication signal in response to an interrogation signal emitted by the management and access system, and comprises a memory for storing an instruction relative to a command issued by the carrier of the identifier if this command is issued during the phase of detection and authentication by the on-board system. The instruction is stored temporarily in order for the identifier to be able to emit a signal related to the command when the detection and authentication phase is complete.

Thus, by including at least one hands-free identifier which is capable of memorizing any command which would be issued by the carrier of this identifier during the emission or reception of signals necessary for the detection, identification and authentication of the identifier, the automatic access and start-up system enables the carrier to avoid having to repeat the command. In fact, an instruction relating to this command is stored in a memory of the identifier, then it is transmitted to the access management system on board the vehicle, immediately after the end of the communications relating to the phase for detection and authentication of the identifier. This thus prevents the carrier of the identifier from having the impression that his command has not been taken into account or otherwise received by the automatic access and start-up system, and it prevents the system from being perceived as faulty.

In one embodiment, the management and access system is configured to activate a function such as a courtesy light if the identifier is detected within a first zone encompassing the vehicle, called courtesy zone.

In one embodiment, the access management system is configured to unlock the vehicle if the identifier is detected within a second zone encompassing the vehicle, called unlocking zone.

In one embodiment, the unlocking zone is more restricted than the courtesy zone.

In one embodiment, the access management system is configured to lock the vehicle if the identifier is detected as having left a third zone encompassing the vehicle, called locking zone.

In one embodiment, the locking zone is more restricted than the courtesy zone and/or more extensive than the unlocking zone.

A method of managing access to a motor vehicle comprising an access management system is also disclosed, the method including a procedure for detecting and authenticating an identifier comprising the following steps:

storing, in a memory of the identifier, an instruction relating to a command issued by the carrier of the identifier during the detection and authentication procedure; and emitting, via the identifier, a signal relating to the command when the detection and authentication procedure is completed.

In one embodiment, the detection and authentication procedure comprises the following steps:

emitting a first interrogation signal via the access management system; and receiving the first interrogation signal by the identifier and emitting a location signal by the identifier.

In one embodiment, the detection and authentication procedure further comprises the following steps:

emitting a second interrogation signal via the access management system; and receiving the second interrogation signal by the identifier and emitting an authentication signal by the identifier.

In one embodiment, the detection and authentication procedure comprises a step of authenticating the authentication signal emitted by the identifier.

A motor vehicle comprising an automatic system for accessing and starting a motor vehicle as defined above and/or implementing a method as defined above is also disclosed.

DESCRIPTION OF THE FIGURES

The present invention will be better understood upon reading the detailed description which follows, done in reference to the appended drawings, in which.

DETAILED DESCRIPTION

Figure 1:
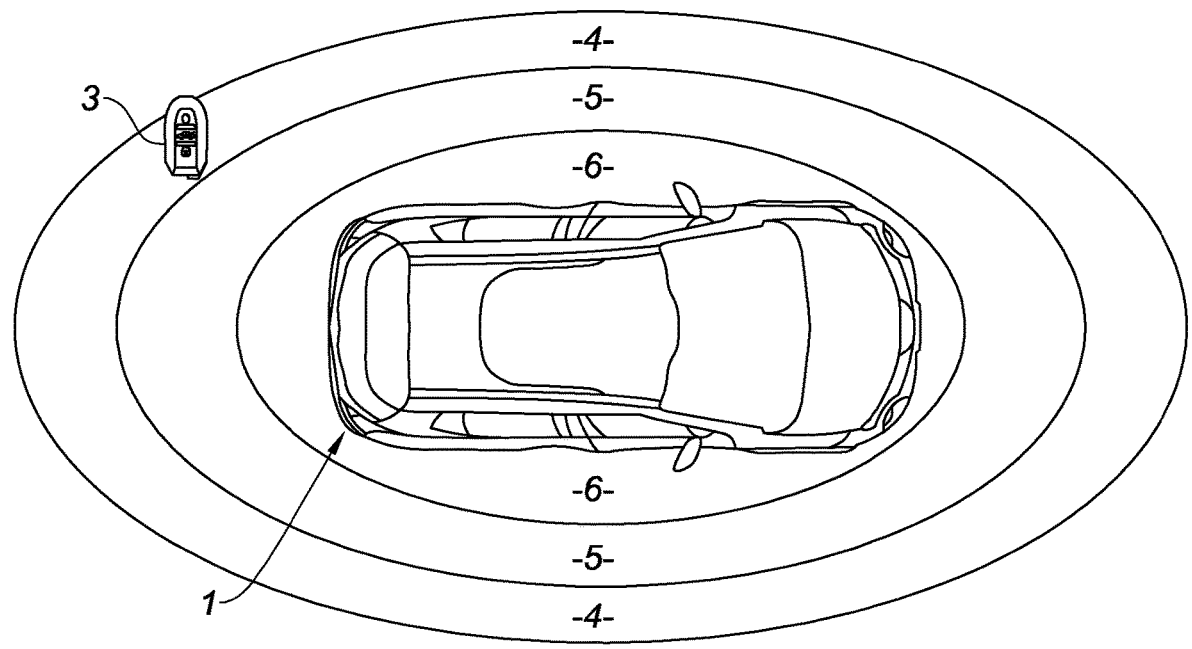
FIGS. 1 and 2 show a vehicle comprising an automatic access and starting system.
Figure 2:
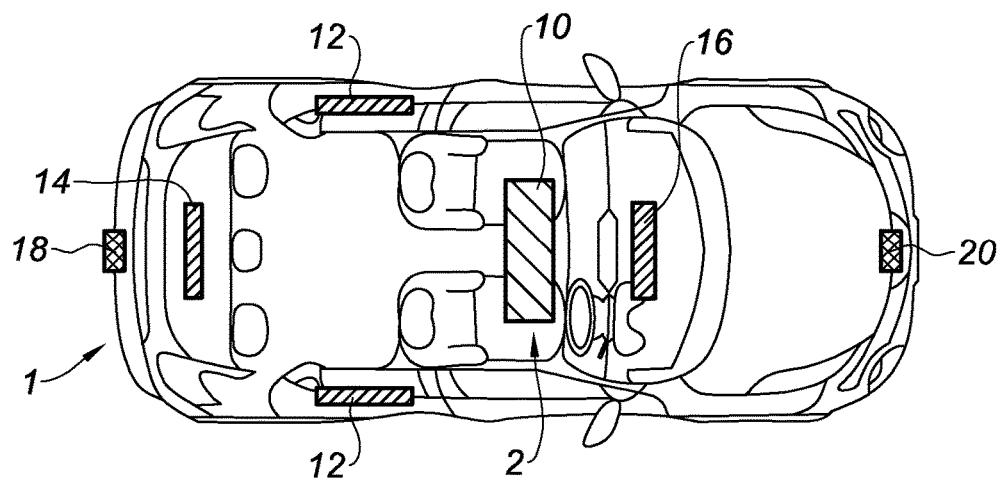

FIGS. 1 and 2 show a motor vehicle 1, the vehicle 1 being equipped with an automatic access and starting system, which comprises an on-board access management system 2 and one or several hands-free identifiers 3, such as an electronic key. The access management system 2 is configured to detect an identifier 3 located near the vehicle 1. The identifier 3 is a portable electronic device, such as an electronic key, an electronic card, etc. The access management system 2 is configured to determine the distance and/or the position of the identifier 3 relative to the vehicle 1, and to authenticate this identifier 3, that is to say, to recognize this identifier as being authorized (since it is associated with this particular vehicle). More precisely, the access management system is able to determine whether the identifier 3 (and therefore its carrier) is located in a determined zone including the vehicle, in order to proceed with its authentication, and, if this is confirmed, to activate one or more functions such as unlocking the vehicle.

The access management system 2 comprises a wireless communication module 10, which is capable of exchanging data via a wireless link with a portable electronic device such as an electronic key, an electronic card, such as the electronic key 3 shown in FIG. 1.

The access management system 2 comprises a plurality of antennas arranged in different areas of the vehicle 1. Advantageously, as shown in FIG. 2, the vehicle comprises at least four antennas that are offset relative to the communication module 10: two side antennas 12 (arranged on each side of the vehicle, for example in a side door), a rear antenna 14 (for example arranged near the rear window), and a front antenna 16 (for example arranged near the windshield). This set of four antennas can advantageously be supplemented by one or more additional antennas, in the example two additional antennas 18, 20 respectively arranged in the rear and front bumpers.

In the example of the figures, all of the remote antennas described above are of the low frequency type. Each antenna is able to emit, at regular intervals, a first interrogation signal which is specific to it. When this first interrogation signal is picked up by a hands-free identifier such as the identifier 3, the identifier in return emits a location signal, in the example a high-frequency signal, that the communication module 10 can receive by means of an internal high-frequency antenna. The location signal received from the identifier allows the access management system to locate the identifier 3, that is to say, to determine that it is near the vehicle, and more precisely what the position of the identifier 3 is, depending on the remote antenna whose identifier is closest.

The access management system 2 then sends a second interrogation signal. When the identifier 3 captures this second interrogation signal, the identifier 3 sends an authentication signal in response which allows the access management system 2 to authenticate the identifier, that is to say to recognize it as an authorized identifier.

The access management system 2 is thus able to detect any penetration of an authorized identifier 3 (and therefore of its carrier) inside a delimited zone around the vehicle, and, in response to this detection, to command the activation of one or more functions such as unlocking the vehicle 1.

In the example, the access management system 2 is able to determine the position of the identifier 3 (and therefore its carrier) in relation to several zones including the vehicle and which partially overlap.

Thus, the access management system 2 is able to determine whether the identifier 3 is located within a first zone including the vehicle, called courtesy zone 4. The edge of the courtesy zone 4, in the example of a generally elliptical shape, is for example at a distance from the vehicle of between 2 and 4 meters, and in particular equal to approximately 3 meters. The detection of an authorized identifier 3 in this first zone can for example trigger the activation of a courtesy light function. This activation notably involves the illumination of the headlights of the vehicle 1 and of various auxiliary lights, such as lights making it possible to illuminate the ground near the doors of the vehicle.

The access management system is also able to determine whether the identifier 3 is located in one or more particular zone(s) in addition to the courtesy zone 4. For example, as can be seen in FIG. 1, two zones may be provided that are more restricted than the courtesy zone 4 and that also encompass the vehicle 1. The most restricted zone is an unlocking zone 6, in which zone the detection of the identifier 3 results in the unlocking of the vehicle. The edge of the unlocking zone 6, which in the example is of generally elliptical shape, is for example located at a distance from the vehicle of between 0.5 and 1.5 meters. The intermediate zone, which in the example is more restricted than the courtesy zone 4 but more extensive than the unlocking zone 6, constitutes a locking zone 5. The detection of the identifier 3 leaving the locking zone 5 while the vehicle is unlocked (for example after the vehicle has stopped or after the identifier 3 has been detected in the unlocking zone 6) results in the access management system 2 commanding the locking of the vehicle. The edge of the locking zone 5, which in the example is of generally elliptical shape, is for example located at a distance from the vehicle of between 1.5 and 2.5 meters.

Of course, a single zone could be provided, for example constituting an unlocking zone and/or a locking zone. Two or more zones could also be provided.

As explained above, the access management system 2 implements a hands-free identifier detection and authentication procedure. Such a protocol involves data exchanges between the access management system 2 and the identifier 3. Thus, the access management system emits a first interrogation signal at regular intervals, at a relatively long interval so as not to consume too much energy, for example every 1200 milliseconds. When an identifier is detected, a second interrogation signal can be emitted at significantly shorter intervals, for example every 300 milliseconds.

According to the method, as long as the data exchanges relating to the detection and authentication of the identifier 3 are not complete, the identifier 3 is able to store any command issued by its carrier, by pressing one of the control buttons equipping the identifier 3. These command buttons are used for various functions, including locking and unlocking the vehicle, and possibly opening the trunk or switching on the low beam headlights. Thus, if the carrier of an identifier presses one of the identifier's command buttons during the detection and authentication phase, the corresponding command will be stored by the identifier 3. Indeed, an instruction relating to this command will be stored temporarily in a memory of the identifier 3, for the time needed for the data exchanges relating to the detection and authentication of the identifier to finish. The stored instruction will then be emitted by the identifier after the end of these exchanges, so that the corresponding command is taken into account by the access management system 2 of the vehicle. Thus, the carrier of the identifier will not be forced to repeat his command until it has an effect, and will therefore not have the impression of a failure of the identifier or of the vehicle.

The invention claimed is:

1. An automatic access and starting system for a motor vehicle, comprising an on-board access management system and at least one identifier, the access management system being configured to detect and authenticate the identifier when it is in proximity to the vehicle,
the identifier being configured to emit a location signal in response to receipt of a first interrogation signal from said access management system and to emit an authentication signal in response to a second interrogation signal emitted by the access management system,
the identifier being adapted to issue an instruction relating to a command to activate a function of the vehicle and comprising a memory; said identifier being adapted to store said instruction in said memory when issued by a carrier of the identifier if this command is issued during a phase of detection and authentication by the on-board access management system, said instruction being stored temporarily in the memory of said identifier, said identifier being adapted to emit a signal related to said command when the detection and authentication phase is complete.

2. The automatic access and starting system according to claim 1, wherein the access management system is configured to activate a function such as a courtesy light if the identifier is detected within a courtesy zone including the vehicle.

3. The automatic access and starting system according to claim 2, wherein the access management system is configured to unlock the vehicle if the identifier is detected within an unlocking zone including the vehicle, the unlocking zone being more restricted than the courtesy zone.

4. The automatic access and starting system according to claim 3, wherein the access management system is configured to lock the vehicle if the identifier is detected as having left a locking zone including the vehicle, the locking zone being more restricted than the courtesy zone and/or more extensive than the unlocking zone.

5. A motor vehicle comprising an automatic system for accessing and starting a motor vehicle according to claim 1.

6. A method of managing access to a motor vehicle comprising an access management system, the method comprising:
a step of said access management system identifying and authenticating an identifier, said identifier being operable by a carrier to emit a command signal commanding said vehicle to activate a function of said vehicle;
a step of said identifier storing, in a memory of the identifier, an instruction relating to a command issued by the carrier of the identifier during a detection and authentication step; and
a step of said identifier emitting said command signal relating to said command when the detection and authentication step is completed.

7. The method according to claim 6, wherein the step of said access management system identifying and authenticating said identifier comprises the following steps:
said access management system emitting a first interrogation signal;
said identifier receiving the first interrogation signal by the identifier and emitting a location signal in response to said first interrogation signal.

8. The method according to claim 7, wherein the step of said access management system identifying and authenticating said identifier further comprises the following steps:
said access management system emitting a second interrogation signal in response to receipt of said location signal from said identifier; and
said identifier receiving the second interrogation signal and emitting an authentication signal in response to receipt of said second interrogation signal.

9. The method according to claim 8, wherein the step of said access management system identifying and authenticating said identifier comprises a step of said access management system authenticating the authentication signal emitted by the identifier.

10. A motor vehicle comprising an automatic system for accessing and starting a motor vehicle according to claim 6.

* * * * *